July 7, 1970     G. P. DEHAINE ET AL     3,518,862
INSTALLATION FOR EXCHANGING THE ROLLERS OF A ROLLING MILL
Filed Dec. 7, 1967     7 Sheets-Sheet 1
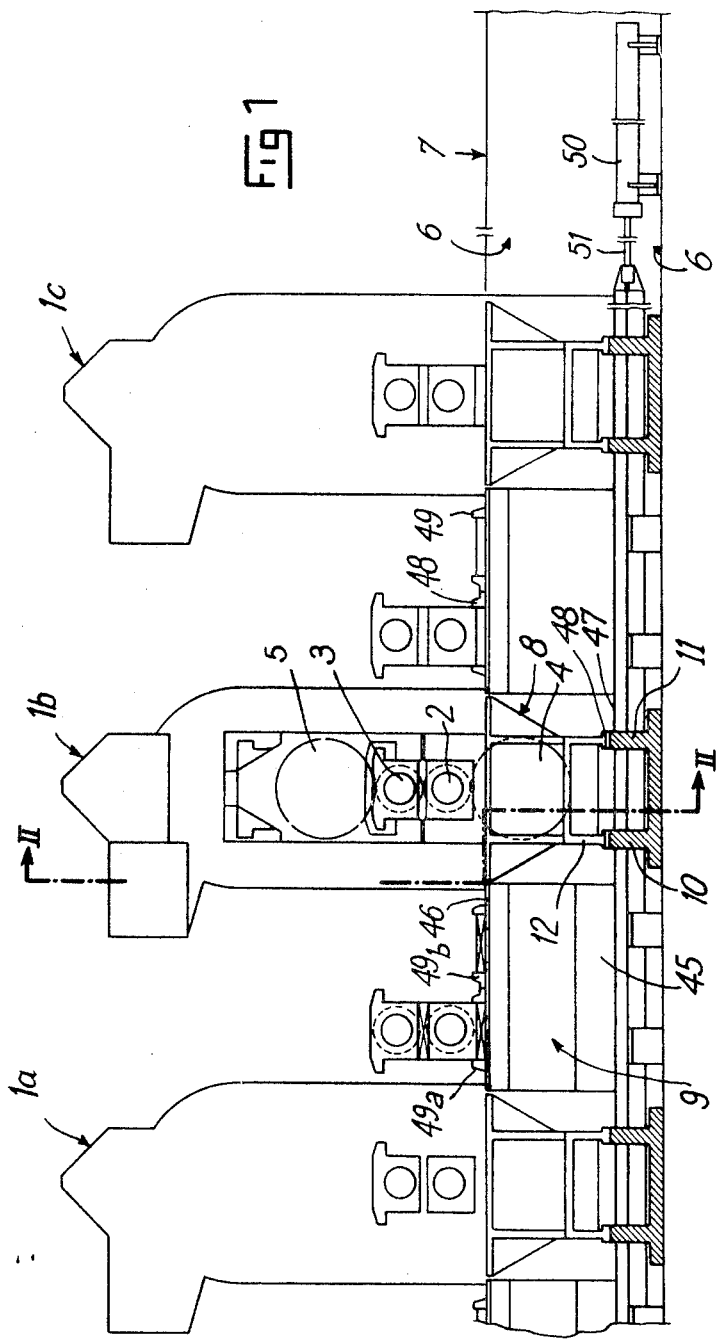
INVENTORS
GEORGES P. DEHAINE
JACQUES M. LEBAS
BY
ATTORNEY

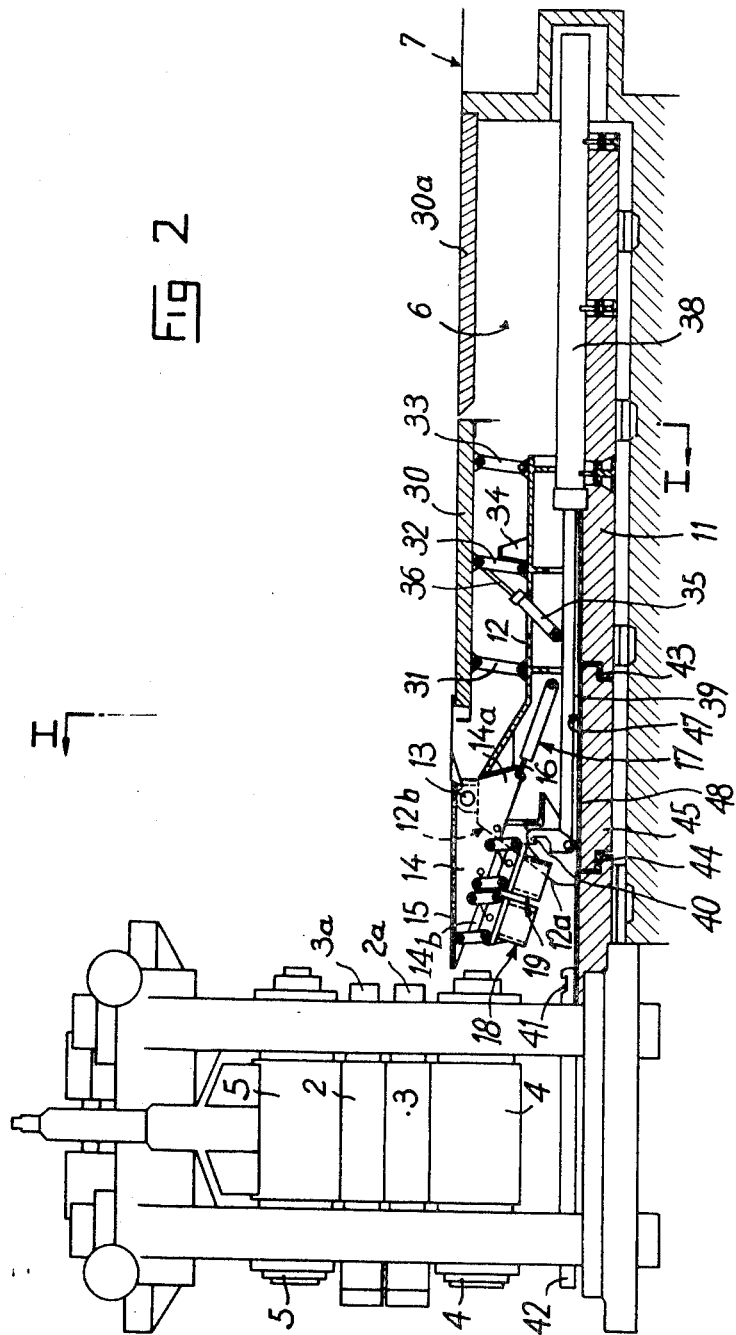

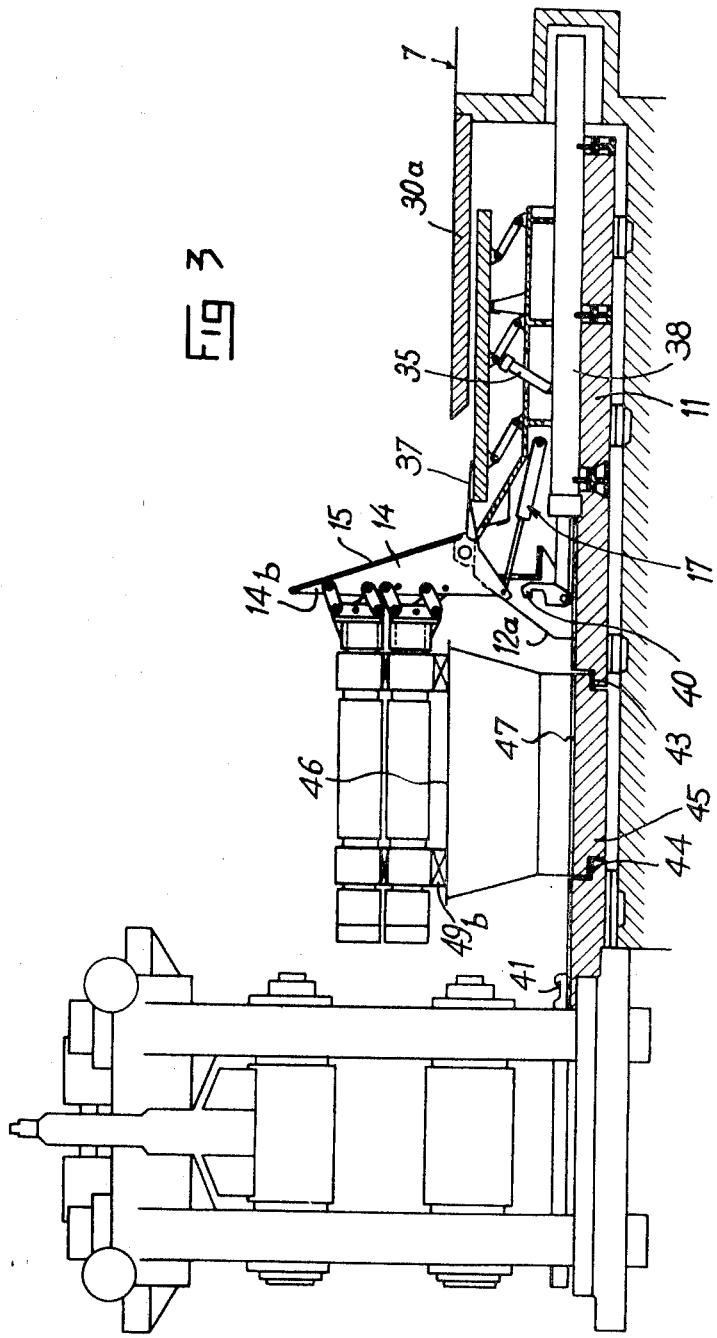

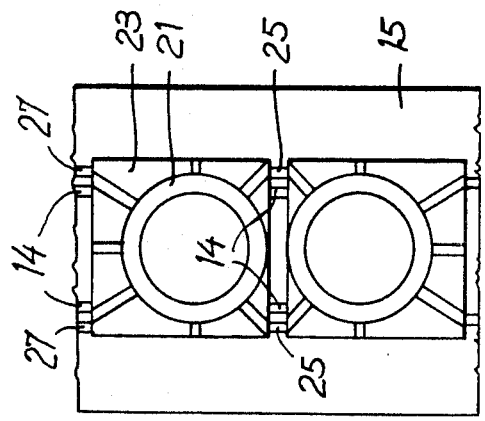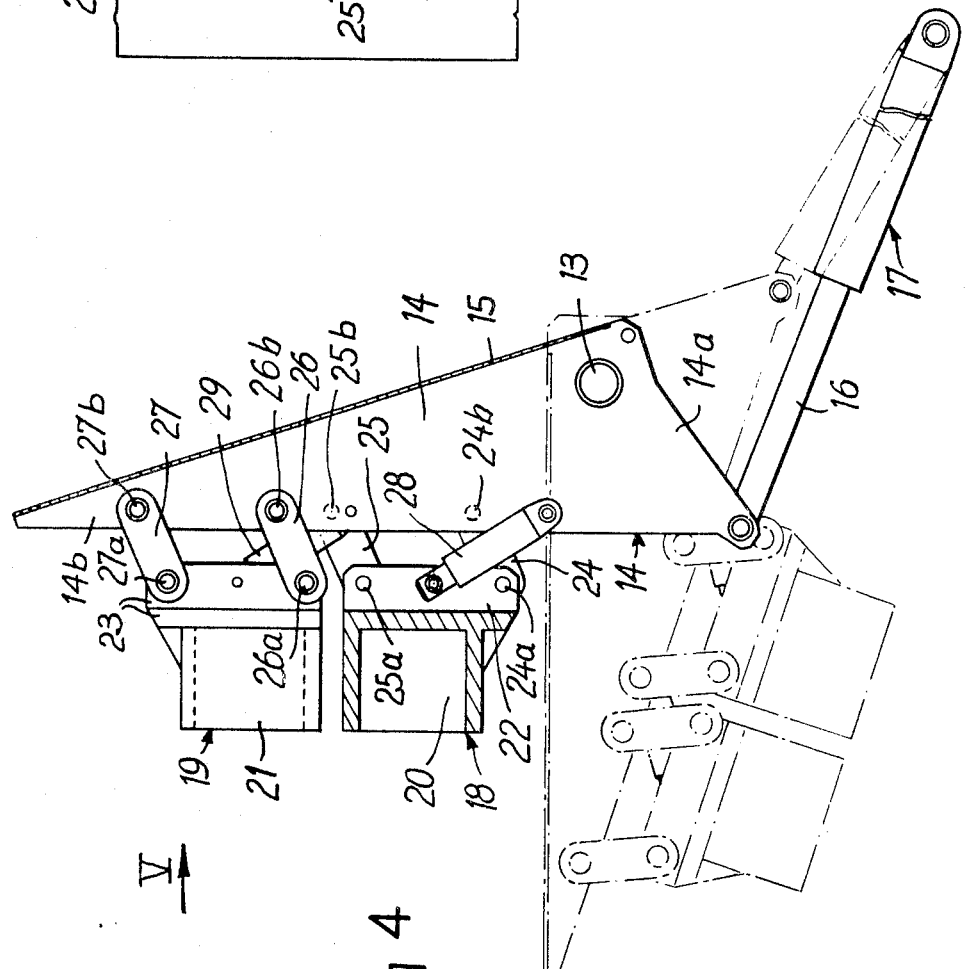

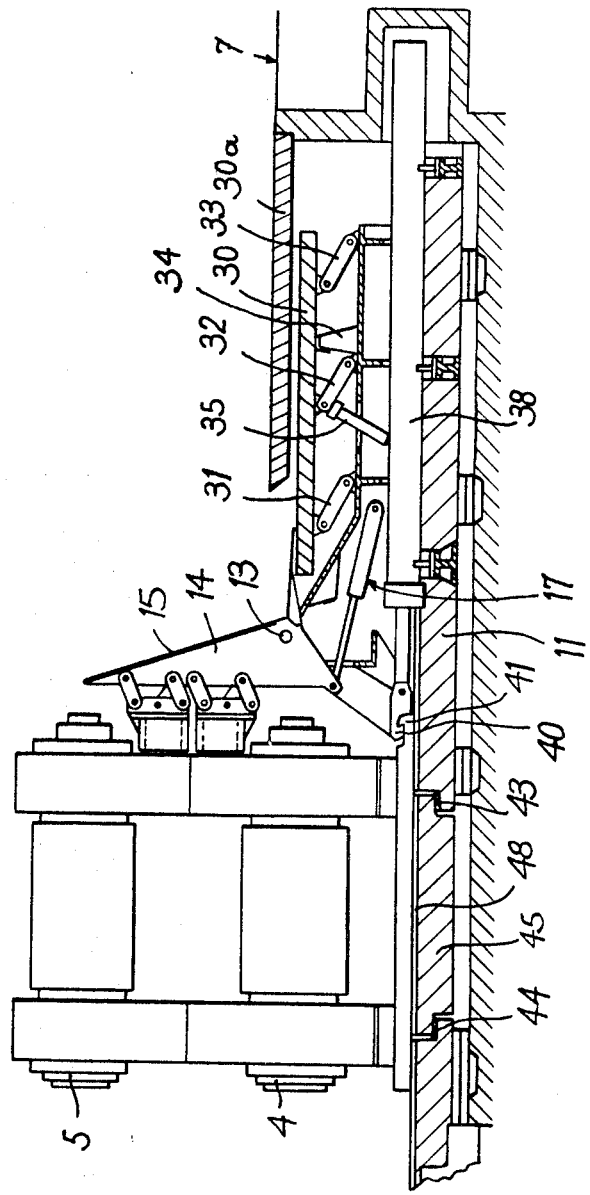

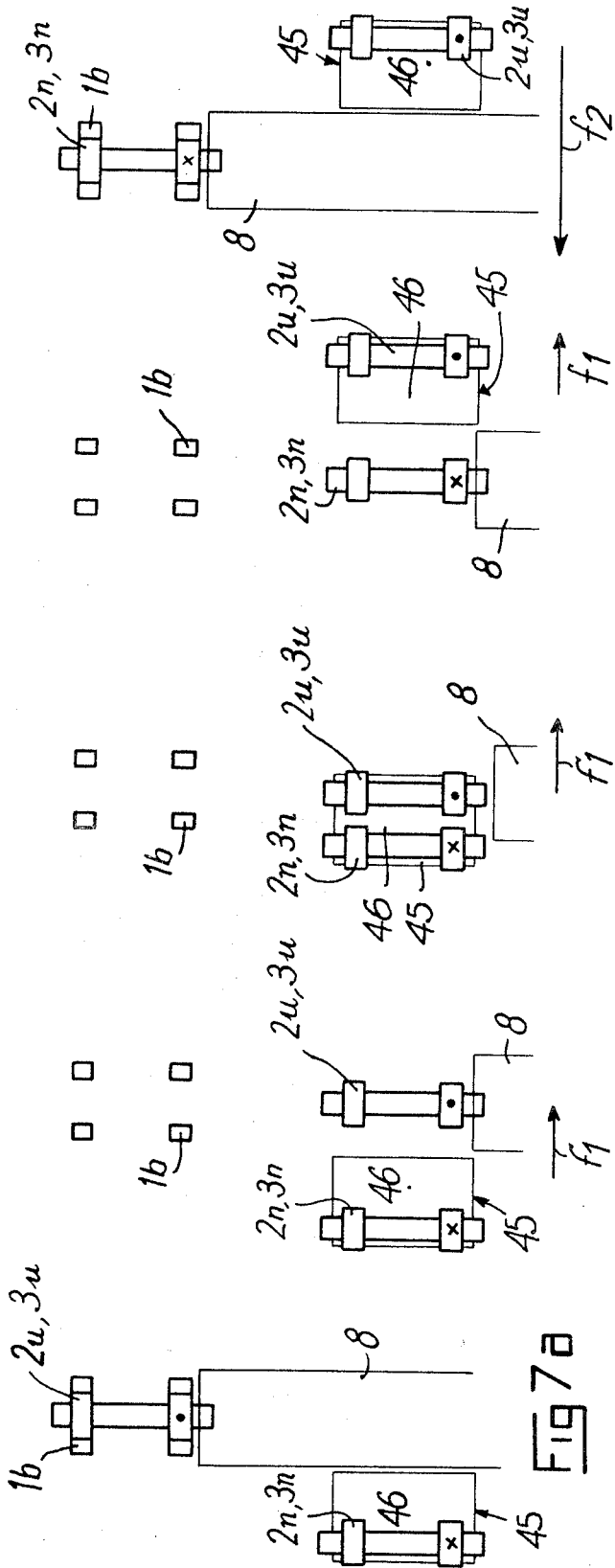

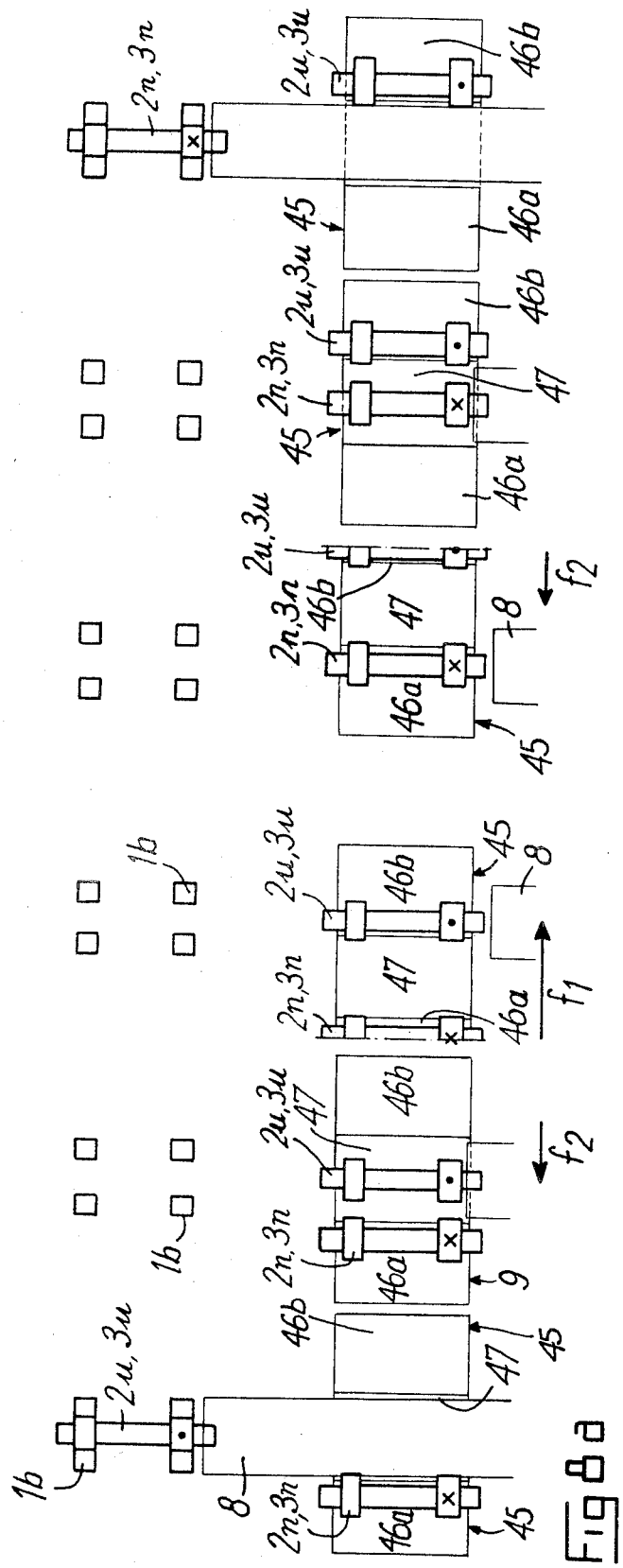

United States Patent Office 3,518,862
Patented July 7, 1970

3,518,862
INSTALLATION FOR EXCHANGING THE
ROLLERS OF A ROLLING MILL
Georges P. Dehaine, Thionville, Moselle, and Jacques M. Lebas, Metz, Moselle, France, assignors to Société Anonyme dite: Société Lorraine de Laminage Continu, Paris, France, a company of France
Filed Dec. 7, 1967, Ser. No. 688,773
Claims priority, application France, Dec. 26, 1966, 88,852
Int. Cl. B21b *31/10*
U.S. Cl. 72—238
9 Claims

ABSTRACT OF THE DISCLOSURE

A device for exchanging the rollers in a rolling mill comprising, a manipulating member having several gripping members movable in a direction which is parallel to the longitudinal axes of the rollers and on a path which is slightly greater than the length of the rollers so as to occupy a first working position in which the gripping members are adjacent to the rollers and a second rest position in which the gripping members are retracted. Further including a transfer member disposed between the manipulating member and the housing of the rolling mill. The transfer member having a transfer carriage movable in a direction parallel to the axis of the rolling mill and including upper and lower platforms of which the upper platform is disposed at floor level and is adapted to receive the rollers while the lower platform is disposed at the level of the base of the housing.

---

The object of the present invention is an installation for exchanging the rollers of a rolling mill, more particularly applicable to strip or sheet quarto rolling mills.

In the case of a quarto mill the work rollers often have to be replaced, whereas the replacement of the support rollers becomes necessary at much greater intervals. The length of the exchange operation for the work rollers carried out with known means is presently of the order of 20 to 25 minutes, that of the support rollers being around several hours. The resulting stoppage time of a rolling mill constitutes a considerable loss of production.

The means used until now for replacing worn rollers by new ones include a shaft, at one end of which is a sleeve intended to cover the cylindrical extension of the roller and the other end of which is provided with a counter-weight, this shaft being worked by a travelling bridge. It can easily be seen that such a process necessitates a modification of the positioning of the slings on the shaft according to whether this latter is empty or carrying a work roller. Furthermore, this shaftsleeve-counterweight assembly only enables one roller to be changed at a time. The stoppage of manufacture is thus very long. It is even more appreciable in the case of a continuous strip mill, where all the work rollers have to be changed during the same stoppage. This disadvantage is even greater when, in the case of a continuous strip mill, the distance between two adjacent roller housings is generally such that two travelling bridges cannot work together on two adjacent housings without obstructing each other.

The object of the present invention is an installation for exchanging the rollers of a rolling mill, which installation does not have the above-mentioned disadvantages and enables the rapid change of the work rollers in a housing without the use of travelling bridges and which, when it is not in use, does not obstruct access to the rolling mill.

In accordance with the invention, the installation for exchanging the rollers in a housing of a rolling mill comprises, on the one hand, a manipulating device disposed opposite to the housing and movable parallel to the axes of the rollers along a path at least slightly greater than the length of a roller and capable of taking up a working position in which the gripping members are substantially in alignment with the rollers and a resting position in which all the gripping members are retracted and in which even the manipulating device has a flat upper surface at floor level, and, on the other hand, a transfer device disposed between the fixed part of the manipulating device and the housing, and having a transfer carriage movable in a direction parallel to the axis of the rolling mill and comprising two platforms, the upper one of which is intended to receive the working roller and is situated at floor level, and the lower one of which is situated substantially at the level of the bottom of the housing.

Thus, it is possible to simultaneously replace all the work rollers of a roller housing and, if necessary, to remove at the same time the worn support rollers in the housing, and to put new support rollers into the housing.

Other advantages and characteristics of the invention will be made clear in the description of a non-limitative embodiment of the roller exchange installation which follows with reference to the accompanying drawings in which:

FIG. 1 is a side view in cross-section along the line I—I of FIG. 2 of a rolling mill, each housing of which is provided with a roller exchange installation according to the invention.

FIG. 2 is a cross-section along the line II—II of FIG. 1, showing a vertical plan view perpendicular to the axis of the rolling mill, through the changing installation in the so-called rest position.

FIG. 3 is a cross-section of the installation along the line II—II of FIG. 1, but in the so-called working position.

FIG. 4 is a more detailed side view of the handling members of the manipulating device of the changing installation, which members cooperate with the work rollers.

FIG. 5 is a partial front view of the handling members along the arrow V of FIG. 4.

FIG. 6 is a side view in partial cross-section along the line II—II of FIG. 1, of the exchange installation shown in a position in which it cooperates with the base of the support rollers.

FIGS. 7*a* to 7*e* show schematically different phases of a first method of using the work roller exchange installation, and FIGS. 8*a* to 8*f* show schematically different phases of a second method of using the work roller exchange installation.

In FIG. 1, three housings 1*a*, 1*b* and 1*c* of a rolling mill of the quarto type have been shown schematically in which mill each housing has two work rollers 2 and 3 flanked in a vertical plane through the axes of the two rollers by two support rollers 4 and 5. The housings 1*a*, 1*b* and 1*c* are partially placed in a pit 6 so that the base of the bearing of the lower work roller 2 is slightly above the level of the floor 7.

As can be seen, more particularly in FIGS. 1 to 3 and 6, the roller exchange installation comprises a manipulating device 8 for the work rollers 2 and 3 and, if necessary, for the support rollers 4 and 5 in the case of a quarto mill, and a transfer device 9 provided between the corresponding housing 1*a*, 1*b* or 1*c* and the fixed part of the manipulating device 8 in rest position.

The manipulating device 8 is movably mounted on two guide rails 10 and 11 secured to the bottom of the pit 6 and perpendicular to the general axis of the rolling mill. The manipulating device 8 comprises a metal supporting frame 12 movable on the guide rails 10, 11 and connected to the rod 39 of at least one handling jack 38 the cylinder of which is fixed to the pit 6 and is parallel to the rails 10 and 11. The rod 39 is connected at its free end to the forward end 12a of the supporting frame 12.

Near its forward end 12a, the supporting frame 12 has an upswept (that is to say the part opposed to the platform 15) elevated portion 12b on which is hinged at 13 near each side a cheek plate 14 acting as a support for a fold-back platform 15. In the rest position of the manipulating device, the fold-back platform 15 is in alignment with the floor level 7 (FIGS. 1 and 2). The two cheek plates 14 of the manipulating device 8 are rigidly connected by the fold-back platform 15 and are hinged by their lower rear ends 14a to the rod 16 of at least one lifting jack 17, the lower end of which is hinged on the supporting frame 12; preferably in the central area of this latter and in such a way that when the rod 16 is inside the cylinder of the jack 17, the platform 15 is horizontal and in alignment with the floor level 7. Since the axis of the jack 17 passes below the hinge 13, the platform 15 swings upwardly when the jack 17 is extended.

The forward part 14b of the cheek plates 14 is furnished with gripping of handling members 18, 19 for the work rollers 2 and 3. In a preferred embodiment, the gripping members 18, 19 are constituted by two sleeves 20, 21 open on the side turned towards the work rollers 2, 3 and having a slightly larger inner diameter than the outer diameter of the cylindrical ends 2a, 3a of the said rollers 2 and 3 (see particularly FIGS. 4 and 5). Reinforcement plates 22, 23 are attached to the rear end of each sleeve 20, 21, which plates are hinged by means of links 24, 25 and 26, 27 on the part 14b of the cheek plates 14 so that the four axes of articulation 24a, 24b, 25a, 25b and 26a, 26b, 27a, 27b of the links 24, 25 and 26, 27 respectively of the corresponding sleeve determine the four apexes of a deformable parallelogram. Adjusting jacks 28, 29 are pivoted on the one hand, on the cheek plates 14, and, on the other hand, on the reinforcement plates 22 and 23 respectively. By means of these adjusting jacks 28, 29 the engagement of the work rollers 2 and 3 in the sleeves 20, 21 is considerably facilitated. A chuck having radially movable jaws could also be used instead of these sleeves. A locking device may be used to lock the ends of the rollers when the said ends are engaged in the sleeves. The mobility of the sleeves 20, 21 with respect to the cheek plates 14 may also be obtained by means of slides provided on the cheek plates 14 and in which are mounted the reinforcement plates 22, 23 and by means of a toothed rack driving mechanism moving the sleeves 20, 21 with respect to the cheek plates 14 along the side of the part 14b. Moreover, the rod 16 of the jack 17 has a length such that the edge of the part of the cheek plates 14 can be at least slightly rearwardly inclined when the jack 17 is extended to position the sleeves 20, 21 to wedge the work rollers in the sleeves.

A movable floor 30 is provided above the central and rear parts of the supporting frame 12 of the manipulating device 8, which floor is connected to the supporting frame 12 by means of several links 31, 32, 33 pivoted on the one hand, on the lower face of the floor 30 and, on the other hand, on the supporting frame 12, in such a manner that the floor 30 may be lowered when it effects, from its rest position in alignment with the floor level 7, a downward movement of translation towards the housing 1b.

In the rest position, the links 31, 32, 33 of the movable floor 30 are slightly rearwardly inclined with respect to the vertical. An abutment 34 fixed to the supporting frame 12 limits the rotation of the central link 32 in a clockwise direction and determines the rest position of the said floor 30. The lower end of a translation jack 35 is hinged to the supporting frame 12 between the first and second links 31 and 32, but in a lower plane, whereas the free end of its rod 36 is hinged to the floor 30, preferably near the joint of the link 32 on the said floor. The translation jack 35 is thus rearwardly inclined from bottom to top and extends when the floor 30 is in its rest position. As can be seen in FIGS. 2, 3 and 6, the rear part of the pit is covered at floor level 7 by a fixed floor 30a. The platform 15 is in rest position at a certain distance from the forward end of the movable floor 30 to take into account the relative approaching movement of these two elements when they are put into working position.

A covering shutter 37, hinged onto the rear part of the platform 15 and defined by an abutment (not shown) provided on the supporting frame 12 to maintain said shutter 37 in horizontal position, ensures continuity between the platform 15 and the movable floor 30 and rests on this latter when it is in its rest position.

The movable supporting frame 12 guided on the guide rails 10 and 11 cooperates with the handling jack 38 fixedly mounted in the pit 6 perpendicular to the axis of the rolling mill and parallel to the axes of the rollers of the housing. The rod 39 of this handling jack 38 is fixed by its free end to the forward end 12a of the supporting frame 12. The free end of the rod 39 is furnished with a retractable hooking device 40 which is intended to engage with a suitably shaped hooking device or hole 41 rigid with the base 42 carrying the support members of the support rollers 4 and 5. This base 42 is also movable and guided on the guide rails 10 and 11 of the manipulating device.

The transfer devices 9 are provided next to the housings 1a, 1b, or 1c and each includes, on the one hand, two guiding slides 43, 44 fixed to the bottom of the pit 6 and disposed parallel to the axis of the rolling mill and perpendicular to the guide rails 10, 11 and to the axes of the rollers 2 to 5, and on the other hand, a transfer carriage 45 comprising two platforms 46, 47, the upper platform 46 being in alignment with the floor level 7 and the lower platform 47 being slightly below the level of the guide rails 10, 11, which are moreover interrupted in the path of the transfer carriage 45. The length of the lower platform 47 of the carriage 45 is substantially equal to or slightly greater than the width of the platform 15. The lower platform 47 is provided with slides 48 which, in a determined position of the carriage 45, become aligned with the guide rails 10, 11 of the manipulating device 8, this determined position shown in FIG. 1 leaving free access to the roller housing for the manipulating device 8.

The upper platform 46 of the transfer carriage 45 is provided at determined places with two support beds 49a, 49b, one of which is intended to receive the new work rollers and the other of which is intended to receive the worn work rollers. These beds 49a, 49b are fixed to the upper platform 46 and include two guiding and locating members so that the rollers placed on the beds are, for a determined position of the carriage 45, in alignment on the one hand with the individual roller housings and, on the other hand, with the sleeves 20, 21 of the manipulating device 8.

For a rolling mill, an exchange installation is provided for each housing. It is advantageous to connect rigidly the transfer carriages 45 of each installation and to control them simultaneously by means of a single control jack 50 mounted at the bottom of the pit 6 parallel to the axis of the rolling mill, the rod 51 of which jack is then connected to the lower platform of an end carriage.

A first method of using the exchange installation for a single roller housing, for example, the housing 1b of FIG. 1, is described below.

During the running of the rolling mill, the exchange installation is in its rest position and the various elements, members, etc. of the installation are in the positions shown in FIGS. 1 and 2, the pit 6 being entirely covered by the various floors and platforms so that free movement next to the housings is possible. In this rest position, the lower platform 47 of the transfer carriage 45 is covered by the fold-back platform 15 of the manipulating device 8. The bed 49a, that is to say in this example the bed which is furthest from the plane passing through the axes of the work rollers 2, 3 mounted in the housing 1b, is furnished with new work rollers which have previously been put on the transfer carriage 45 by means of a travelling bridge.

In order to exchange the worn work rollers for new rollers, the translation and lifting jacks 35 and 17 are simultaneously controlled in such a way that at the end of this operation the axes of the sleeves 20, 21 are substantially horizontal and in alignment with the axes of the corresponding work rollers 2 and 3 and that the movable floor 30 is lowered below the level of the fixed floor 30a. The handling jack 38 is then activated so as to advance the movable part of the manipulating device towards the housing 1b and when the sleeves 20, 21 are immediately next to the cylindrical ends 2a, 3a of the rollers 2 and 3, the exact alignment of the axes of the sleeves 20, 21 with those of the rollers 2 and 3 is adjusted by means of the adjusting jacks 28, 29. The sleeves 20, 21 are then engaged onto the cylindrical ends 2a, 3a. In order to remove the work cylinders 2 and 3, including their bearings, the cheek plates 14 are swung slightly rearwardly by means of the lifting jacks 17 to obtain a wedged liaison between ends 2a, 3a and the said sleeves 20, 21, and the sleeves 20, 21 are then slightly lifted by means of the adjusting jacks 28, 29, so that the rollers 2, 3 are lifted up from their individual housings. This wedging operation by means of the lifting jacks 17 can be omitted if a chuck having radially movable jaws or a locking device to lock the cylindrical ends 2a, 3a in the sleeves is used instead of the sleeves.

In FIGS. 7a to 7c, the various operational phases in the exchange of the worn work rollers 2u and 3u for the new work rollers 2n and 3n are shown very schematically, the work rollers being superposed two by two and furnished with their bearings. FIG. 7a shows that the manipulating device 8 has approached the housing 1b and has taken up the worn rollers 2u and 3u, the upper platform 46 of the transfer carriage 45, furnished in its left hand area with a pair of new rollers 2n and 3n placed on the bed 49a, being on the lefthand side of the path of the manipulating device 8. This device 8 then moves back with the worn rollers 2u and 3u to its rear position (FIG. 7b). The transfer carriage 45 is then advanced from left to right following the arrow $f_1$ until the bed 49b of the upper platform 46 is below the worn rollers 2u, 3u. The worn rollers 2u, 3u are then placed on the platform 46 or, more exactly, on the bed 49b (FIG. 1) provided on this platform 46 and the sleeves 20, 21 are removed from the cylindrical ends of the worn rollers 2u, 3u by operating in the appropriate direction the adjusting jacks 28, 29, the lifting jacks 17 and the handling jack 38 (FIG. 7c).

The transfer carriage 45 is again moved to the right following the arrow $f_1$ until the new rollers 2n, 3n are in alignment with the sleeves of the manipulating device 8 and the individual housings of the housing 1b. There the sleeves are engaged onto the ends of the new rollers 2n, 3n and the new rollers are slightly lifted off the platform 46. The transfer carriage 45 is then again moved towards the right following the arrow $f_1$ until the upper platform 46 has completely freed the path of the manipulating device 8 (FIG. 7d). At this point the manipulating device 8 carrying the new rollers 2n, 3n is then advanced towards the housing 1b and the new rollers are placed in the corresponding individual housings (FIG. 7e). The manipulating device 8 is then moved back into its rear working position and the transfer carriage 45 is returned to its starting position in the direction of the arrow $f_2$. The manipulating device 8 is then advanced towards the housing 1b until the forward end 12a is again in the position indicated in FIG. 2. The platform 15 is then folded back and the movable floor 30 is raised so that the two elements are again in their rest position (FIG. 2) in which the whole of the pit 6 is covered and there is free access to the housing 1b. The actual operation of exchanging the work rollers lasts for a maximum of only a few minutes, for example three to five minutes, and the productivity of a mill is thus considerably increased. When the roller exchange installation is in its rest position, the worn work rollers may then be removed from the upper platform 46 and new rollers put into position.

If it is also desired to replace the worn support rollers 4, 5 by new support cylinders, the same operations are carried out until the installation is in the position shown in FIG. 7c. The transfer carriage 9 loaded with worn and new work cylinders 2u, 3u and 2n, 3n is returned towards the left. The manipulating device 8 is advanced towards the housing 1b and the hooking device 40 is then retracted, which hooking device or hole 41 of the base 42 bearing the support rollers 4 and 5 and the supports of these latter. When the manipulating device 8 is brought back towards its rear position, it removes the base 42 and the support cylinders 4 and 5 from the housing, the base being guided by the guide rails 10, 11 and the slides 48 of the lower platform 47, which slides are then in alignment with the said rails (FIG. 6). After having lifted the hooking device 40, the manipulating device 8 is again moved slightly back to completely free the support rollers 4 and 5. The support rollers 4, 5 and their bearings are then removed by means of a travelling bridge and another set of new support rollers and their bearings are then put into place on the base 42. Locating members are of course provided on the base 42 to determine the exact position of the new rollers with respect to the housing 1b. The assembly—base 42, new support rollers—is introduced by the pushing effect exercised on the base 42 by the forward part of the rod 39 of the handling jack 38, the hooking device 40 being raised.

The manipulating device 8 is then again moved back into its rear position and the transfer carriage 45 is moved following the arrow $f_1$ until the new work rollers 2n, 3n are opposite their individual housings provided in the housing 1b. The following operations are identical with those previously described with reference to FIGS. 7d and 7e.

The second method of using the exchange installation is shown schematically in FIGS. 8a to 8f. To this effect, a transfer carriage 45 is used which has two upper half-platforms 46a, 46b flanking the lower platform 47. When several transfer carriages 45 are rigidly connected together, as is shown in FIG. 1, it is sufficient to place the new rollers on the bed 49b of the platform 46 situated to the left of the housing 1b and the worn rollers on the bed 49a of the platform 46 situated to the right of the housing 1b.

After the sleeves 20, 21 have been put in their working position, they are engaged onto the ends of the worn work rollers 2u, 3u (FIG. 8a) and the manipulating device 8 is then brought back into its rear position (FIG. 8b). The carriage 45 is then moved towards the left following the arrow $f_2$ and the worn rollers 2u, 3u are placed on the half-platform 46b. The transfer carriage 45 is then advanced towards the right following the arrow $f_1$ (FIG. 8c). When the new rollers 2n, 3n have reached the level of their individual housings in the housing 1b, the transfer carriage 45 is stopped (FIG. 8d). The manipulating device 8 then takes on the new rollers 2n, 3n, lifting them slightly from the half-platform 46a and the transfer carriage 45 is returned towards the left following the arrow $f_2$ so that the lower platform 47 of the carriage 45 is under the path of the manipulating device 8 (FIG. 8e). The advance of the manipulating device 8 towards the housing 1b then causes the introduction of the new rollers 2n, 3n into the said housing (FIG. 8f). After the device 8 has returned to the position in which the supporting frame 12 occupies the position shown in FIG. 2, the patform 15 can be folded back with the sleeves 20, 21 and the movable floor 30 can be raised to the floor level (FIG. 2).

The embodiment of the roller exchange installation in cooperation with a roller mill of the quarto type and the methods of using this installation, have of course been described above only by way of example. The invention applies to all other types of rolling mill necessitating the simultaneous exchange of several rollers. The object of the invention may be modified in numerous ways without exceeding the scope of the invention.

What we claim is:

1. Apparatus for exchanging rolls in the housing of a rolling mill in which said housing has its base disposed below a main floor level comprising, a manipulating device disposed adjacent to said roll mill housing, means supporting said manipulating device for movement parallel to the longitudinal axes of the rolls, said manipulating device including gripping members adapted to grip the ends of said rolls and means mounting said gripping members on a support frame between an operable position wherein the gripping members are above the floor level and a storage position where the gripping members are below the floor level, said manipulating device further including a cover plate mounted by pivotal means on said support frame for movement between one position wherein the cover plate is substantially flush with said main floor level and another position wherein the cover plate underlies the main floor level, transfer means disposed adjacent to said housing between the latter and said manipulating device support frame and movable along a path parallel to the general longitudinal axis of the rolling mill, said transfer means including a transfer carriage having an upper platform disposed at the main floor level for carrying rolls, said gripping members being operable to transfer used rolls from said roll mill housing to said transfer carriage platform and to subsequently transfer new rolls from said transfer carriage platform to said roll mill housing.

2. Apparatus according to claim 1 wherein said transfer carriage has a lower platform disposed laterally of said upper platform and substantially at the level of said housing base, said upper platform being adapted to receive working rolls and said lower platform receiving support rolls, and hook means on said manipulating device for operatively engaging said housing base.

3. Apparatus according to claim 2 wherein said manipulating device support frame is mounted on guide rails generally perpendicular to the general longitudinal axis of the rolling mill, said guide rails being fixed to the bottom of a pit adjacent the rolling mill housing and operable jack means in said pit for moving said manipulating device on said guide rails to and from said rolling mill housing.

4. Apparatus according to claim 1 wherein said means for mounting said gripping members on said support frame comprises a pair of cheek plates pivotally mounted about a horizontal axis on an upper end of said support frame, a linking platform rigidly connected to said cheek plates, said linking platform having a rest position aligned with said main floor level, said cheek plates pivotally mounting said gripping members about a horizontal axis, and operable means between said cheek plate and support frame for pivotally moving said cheek plates relative to said support frame.

5. Apparatus according to claim 4 wherein said cover plate in said one position overlies said support frame and is in substantially the same plane as said linking platform when the latter is in said rest position, said cover plate being connected to said support frame by a plurality of links, and operable means for moving said cover plate between its two pivotal positions.

6. Apparatus according to claim 2 wherein said transfer means comprises two fixed guiding slides disposed parallel to the general longitudinal axis of the rolling mill, said lower platform of said transfer means being slightly lower than the level of said guide slides.

7. Apparatus according to claim 4 wherein said gripping members each comprises a sleeve open on the side thereof facing the rolls, said sleeves having reinforcement plates, and adjusting and link means operatively connecting said reinforcement plates to said cheek plates.

8. Apparatus according to claim 2 further comprising operable jack means having a fixed power cylinder and a piston rod attached to said support frame, said hook means being mounted on said piston rod and being operable to engage a suitable hooking member on a support roll base element, said latter element being movable and guided by said support means which support said manipulating device for movement parallel to the longitudinal axis of the rolls.

9. Apparatus according to claim 3 wherein a plurality of transfer carriages are provided, each of which is associated with a housing of the rolling mill, means connecting said carriages to one another in tandem parallel to the general longitudinal axis of the rolling mill, and a power cylinder having an operating piston connected to the end transfer carriage for simultaneously moving all of said transfer carriages.

References Cited

UNITED STATES PATENTS

| | | | |
|---|---|---|---|
| 3,221,530 | 12/1965 | Swallow et al. | 72—238 |
| 3,323,345 | 6/1967 | Lyle et al. | 72—239 |
| 3,376,724 | 4/1968 | Wolfendale et al. | 72—239 |
| 3,451,244 | 6/1969 | Stover et al. | 72—239 |

FOREIGN PATENTS 1,029,500  5/1966  Great Britain.

CHARLES W. LANHAM, Primary Examiner

B. J. MUSTAIKIS, Assistant Examiner